(12) United States Patent
Sutardja

(10) Patent No.: US 7,610,498 B2
(45) Date of Patent: Oct. 27, 2009

(54) VERY LOW VOLTAGE POWER DISTRIBUTION FOR MOBILE DEVICES

(75) Inventor: Sehat Sutardja, Los Altos Hills, CA (US)

(73) Assignee: Marvell World Trade Ltd., St. Michael (BB)

( * ) Notice: Subject to any disclaimer, the term of this patent is extended or adjusted under 35 U.S.C. 154(b) by 797 days.

(21) Appl. No.: 11/216,843

(22) Filed: Aug. 31, 2005

(65) Prior Publication Data

US 2006/0271701 A1 Nov. 30, 2006

Related U.S. Application Data

(60) Provisional application No. 60/685,915, filed on May 31, 2005, provisional application No. 60/708,903, filed on Aug. 17, 2005.

(51) Int. Cl.
*G06F 1/26* (2006.01)
*G06F 1/00* (2006.01)
*H02J 7/00* (2006.01)

(52) U.S. Cl. .................. 713/320; 713/300; 320/117; 320/126

(58) Field of Classification Search .............. 713/320, 713/300; 320/117, 126
See application file for complete search history.

(56) References Cited

U.S. PATENT DOCUMENTS

| | | | |
|---|---|---|---|
| 3,866,614 A | 2/1975 | Svensson et al. | |
| 4,096,866 A | 6/1978 | Fischell et al. | |
| 5,411,537 A | 5/1995 | Munshi et al. | |
| 5,701,597 A * | 12/1997 | Nakanishi et al. | 455/127.1 |
| 5,814,972 A * | 9/1998 | Shimada et al. | 320/132 |
| 5,959,368 A * | 9/1999 | Kubo et al. | 307/18 |
| 6,160,702 A | 12/2000 | Lee et al. | |
| 6,218,810 B1 * | 4/2001 | Matsumoto | 320/134 |
| 6,262,494 B1 * | 7/2001 | Tsukuni et al. | 307/80 |
| 2003/0151875 A1 | 8/2003 | Nguyen et al. | |

(Continued)

FOREIGN PATENT DOCUMENTS

DE 38 23 922 A1 1/1989

(Continued)

OTHER PUBLICATIONS

Communication from the European Patent Office dated Sep. 6, 2006 with the extended European Search Report for Application No. 06009374.7-2224; 6 pages.

(Continued)

*Primary Examiner*—Mark Connolly
*Assistant Examiner*—Stefan Stoynov

(57) ABSTRACT

A mobile computing device comprises a central processing unit (CPU), memory that communicates with said CPU, an interface that communicates with said memory and said CPU and a display that communicates with said interface. A first distributed load center has first and second load terminals and includes at least a first distributed load. A second distributed load center has first and second load terminals and includes at least a second distributed load. A first distributed power source includes a first battery that is directly connected and primarily supplies power to the first and second load terminals of the first distributed load center. A second distributed power source includes a second battery that is directly connected and primarily supplies power to the first and second load terminals of the second distributed load center.

58 Claims, 9 Drawing Sheets

U.S. PATENT DOCUMENTS

| | | | |
|---|---|---|---|
| 2004/0160213 A1 | 8/2004 | Stanesti | |
| 2004/0164708 A1* | 8/2004 | Veselic et al. | 320/132 |
| 2006/0145538 A1* | 7/2006 | Proefrock et al. | 307/18 |

FOREIGN PATENT DOCUMENTS

| | | | |
|---|---|---|---|
| JP | 07049731 | | 2/1995 |
| JP | 2001298952 | | 10/2001 |
| JP | 2001298952 A | * | 10/2001 |
| WO | WO 99/33124 | | 7/1999 |
| WO | WO 2004/025802 | | 3/2004 |

OTHER PUBLICATIONS

Communication from the European Patent Office dated Oct. 16, 2006 with the extended European Search Report for Application No. 06009378.8-2207; 7 pages.

Official Action including the Search Report and Written Opinion form the Intellectual Property Office of Singapore dated Jun. 22, 2007 for Application No. SG 200603157-9; 8 pages.

Official Action including the Search Report and Written Opinion form the Intellectual Property Office of Singapore dated Jun. 22, 2007 for Application No. SG 200603159-5; 9 pages.

Official Communication from the European Patent Office dated Jun. 22, 2007 for Application No. 06 009 374.7-2207; 1 page.

Official Communication from the European Patent Office dated Jun. 21, 2007 for Application No. 06 009 378.8-2207; 1 page.

* cited by examiner

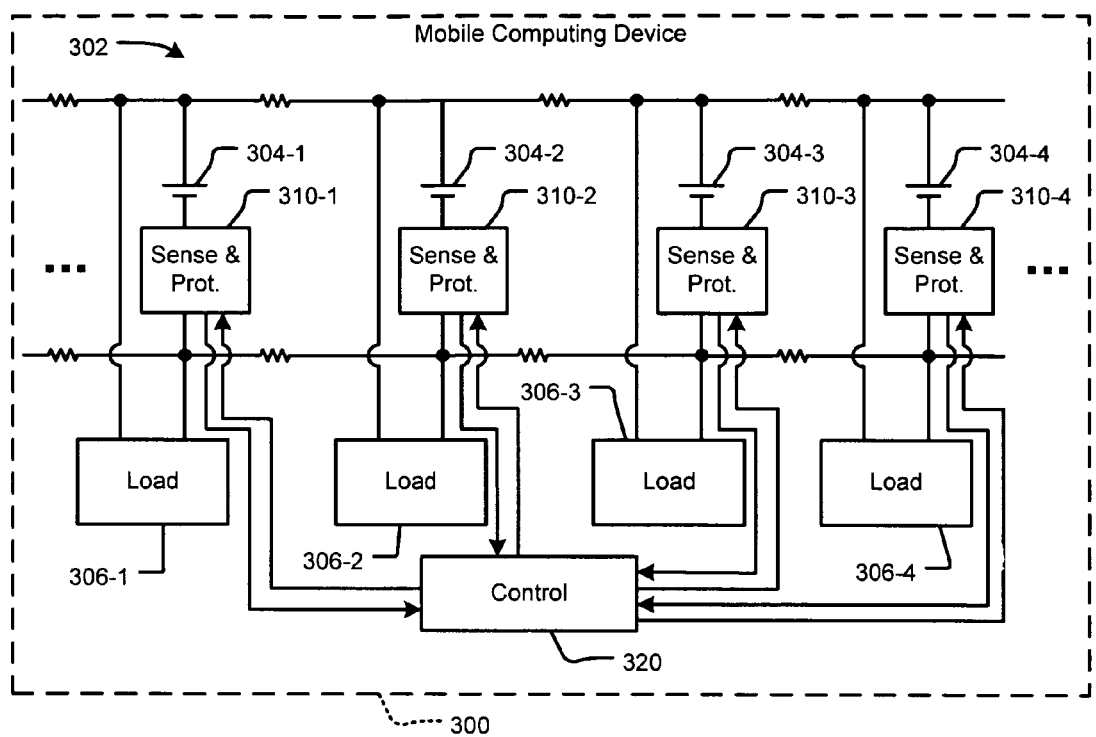
FIG. 15
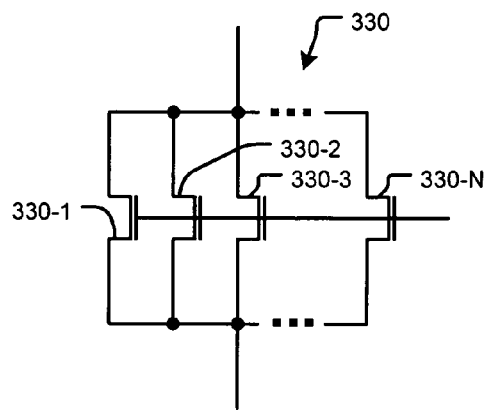
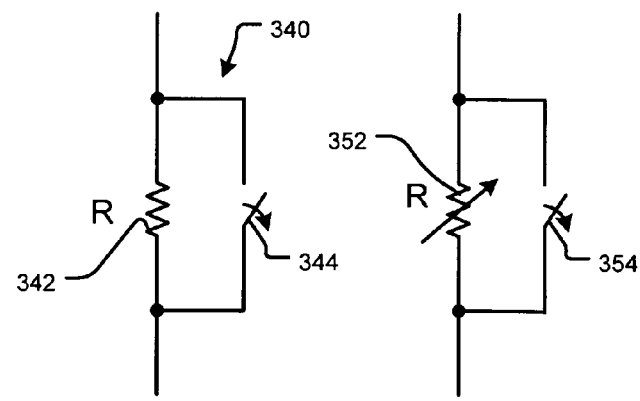
FIG. 16A     FIG. 16B     FIG. 16C

VERY LOW VOLTAGE POWER DISTRIBUTION FOR MOBILE DEVICES

CROSS-REFERENCE TO RELATED APPLICATIONS

This application claims the benefit of U.S. Provisional Application No. 60/685,915, filed on May 31, 2005 and U.S. Provisional Application No. 60/708,903, filed on Aug. 17, 2005. The disclosures of the above applications are incorporated herein by reference in their entirety.

FIELD OF THE INVENTION

The present invention relates to power distribution systems for mobile computing devices, and more particularly to low voltage power distribution systems for mobile computing devices.

BACKGROUND OF THE INVENTION

Mobile digital computing devices or ("mobile computing devices") such as laptop computers, personal digital assistants (PDAs), MP3 players, video recorders, cameras and/or other mobile computing devices are steadily increasing in popularity. Laptop computers in particular offer increased mobility as compared to desktop computers. Laptop computers are powered by a battery pack that typically includes batteries that are connected in series. Battery life between charging is one important design consideration. Laptop weight and size are also important design considerations.

Advancements in semiconductor technology are leading to both longer battery life and improved laptop performance. Despite recent improvements in battery life, conventional battery systems used in laptop computers and other mobile computing devices do not efficiently make use of the maximum available energy from the battery pack.

Due to customer preferences, increasing battery life by increasing battery size and/or weight are generally not acceptable. Therefore, battery efficiency should be increased to increase overall battery life. Improvements in battery efficiency are typically accomplished by increasing battery supply voltage. Higher battery voltage is typically accomplished by connecting additional batteries in series and/or increasing the voltage of each battery. Generally, higher battery supply voltage increases efficiency by reducing operating current, which reduces $I^2R$ loss or losses due to parasitic distribution resistance. Typical laptop computers operate using a battery voltage between 10.8V nominal (12.6V maximum) and 18V nominal (21V maximum). For example, a stack of three to five lithium ion (LiOn) batteries that are connected in series may be used as a voltage source in laptop computers.

Energy loss due to parasitic distribution resistance is not the sole cause of battery inefficiency in laptop computers and other mobile computing devices. In particular, conversion loss also occurs when converting high battery voltages to voltages that are low enough for use by certain types of semiconductor devices. Conversion loss is also a significant cause of battery inefficiency. For example, a DC/DC converter that converts 12V battery voltage to 1V supply voltage (i.e. 12:1) may have a conversion loss of approximately 12-25%. A DC/DC converter that converts a 4V battery voltage to a 1V supply voltage (i.e. 4:1) may have a conversion loss of approximately 5-10%.

SUMMARY OF THE INVENTION

A distributed power source for a mobile computing device comprises a first distributed load center having first and second load terminals and including at least a first distributed load. A second distributed load center having first and second load terminals and including at least a second distributed load. A first distributed power source includes a first battery that is directly connected and supplies power to the first and second load terminals of the first distributed load center. A second distributed power source includes a second battery that is directly connected and supplies power to the first and second load terminals of the second distributed load center.

In other features, the first and second load terminals of the first distributed load center communicate with the first and second load terminals of the second distributed load center, respectively. The first and the second batteries include Lithium Ion batteries. A battery pack includes the first and second batteries. A first battery pack includes the first battery and a second battery pack that includes the second battery. At least one of the first distributed load and the second distributed load is selected from a group consisting of a central processing unit (CPU), a memory, a graphics processing unit (GPU), a hard disk drive (HDD), and a DVD drive. A battery pack includes the first battery, the second battery, and a first connection between first terminals of the first and second batteries and a second connection between second terminals of the second batteries.

In other features, a motherboard provides connections between first terminals of the first and second batteries and between second terminals of the first and second batteries. The connections include first metal stiffeners that connect the first terminals of the first and second batteries to power traces planes of the motherboard and second metal stiffeners that connect the second terminals of the first and second batteries to a ground traces/planes of the motherboard.

In other features, the first battery has a first capacity and the second battery has a second capacity. The first battery pack has first physical dimensions and the second battery pack has second physical dimensions, and wherein at least one of the first physical dimensions is different than at least one of the second physical dimensions. The first battery pack is located remotely from the second battery pack in the mobile computing device.

In other features, a first DC/DC converter receives a first voltage from the first battery and outputs a second voltage to the first distributed load center. The DC/DC converter is one of a step-down converter and a step-up converter. A second DC/DC converter receives a third voltage from the first battery and outputs a fourth voltage to the second distributed load center.

In other features, a first DC/DC converter receives a first voltage from the first battery and outputs a second voltage. A second DC/DC converter receives the second voltage from the first DC/DC converter and outputs a third voltage to the first distributed load center. The first DC/DC converter is a step-down converter and the second DC/DC converter is a step-up converter. The second DC/DC converter is a 1:n converter. At least one of the first battery and the second battery includes a universal serial bus (USB) battery. The USB battery includes a short circuit protection device. The first distributed load center operates at a first voltage and the second distributed load center operates at least one of the first voltage and a second voltage. The DC/DC converter has a conversion ratio that is less than or equal to 4:1.

In other features, a first contactor selectively disconnects at least one of the first and second terminals of the first battery. A second contactor selectively disconnects at least one of the first and second terminals of the second battery. A short circuit detecting module communicates with at least one of the first and second contactors, detects a short circuit in at least one of the first and second batteries and selectively disconnects at least one of the first and second batteries. The first DC/DC converter operates at a first frequency and the second DC/DC converter operates at a second frequency that is different than the first frequency.

In other features, the mobile computing device comprises a central processing unit (CPU), memory that communicates with said CPU, an interface that communicates with said memory and said CPU and a display that communicates with said interface.

A distributed power source for a mobile computing device comprises first distributed load means having first and second load terminals for providing at least a first distributed load. Second distributed load means has first and second load terminals for providing at least a second distributed load. First distributed source means for providing power includes a first battery that is directly connected and supplies power to the first and second load terminals of the first distributed load means. Second distributed source means for providing power includes a second battery that is directly connected and supplies power to the first and second load terminals of the second distributed load means.

In other features, the first and second load terminals of the first distributed load means communicate with the first and second load terminals of the second distributed load means, respectively. The first and the second batteries include Lithium Ion batteries. A battery pack includes the first and second batteries. A first battery pack includes the first battery and a second battery pack that includes the second battery. At least one of the first distributed load and the second distributed load is selected from a group consisting of a central processing unit (CPU), a memory, a graphics processing unit (GPU), a hard disk drive (HDD), and a DVD drive. A battery pack includes the first battery, the second battery, and a first connection between first terminals of the first and second batteries and a second connection between second terminals of the second batteries.

In other features, motherboard means provides connections between first terminals of the first and second batteries and between second terminals of the first and second batteries. The connections include first metal connecting means that connect the first terminals of the first and second batteries to power traces/planes of the motherboard means. Second metal connecting means connect the second terminals of the first and second batteries to a ground traces/planes of the motherboard means.

In yet other features, the first battery has a first capacity and the second battery has a second capacity. The first battery pack has first physical dimensions and the second battery pack has second physical dimensions. At least one of the first physical dimensions is different than at least one of the second physical dimensions. The first battery pack is located remotely from the second battery pack in the mobile computing device. First DC/DC converting means converts a first voltage from the first battery to a second voltage for the first distributed load center. The DC/DC converting means is one of a step-down converter and a step-up converter. Second DC/DC converting means converts a third voltage from the second battery to a fourth voltage for the second distributed load center.

In other features, first DC/DC converting means converts a first voltage from the first battery to a second voltage. Second DC/DC converting means converts the second voltage from the first DC/DC converting means to a third voltage for the first distributed load center. The first DC/DC converting means is a step-down converter and the second DC/DC converting means is a step-up converter. The second DC/DC converting means is a 1:n converter. At least one of the first battery and the second battery includes a universal serial bus (USB) battery. The USB battery includes short circuit protecting means for preventing short circuits. The first distributed load center operates at a first voltage and the second distributed load center operates at at least one of the first voltage and a second voltage. The DC/DC converting means has a conversion ratio that is less than or equal to 4:1.

In other features, first switch means selectively disconnects at least one of the first and second terminals of the first battery. Second switch means selectively disconnects at least one of the first and second terminals of the second battery. Short circuit detecting means communicates with at least one of the first and second switch means, detects a short circuit in at least one of the first and second batteries and selectively disconnects at least one of the first and second batteries. The first DC/DC converting means operates at a first frequency and the second DC/DC converting means operates at a second frequency that is different than the first frequency.

In other features, the mobile computing device comprises processing means for processing, memory means for storing that communicates with said processing means, interface means for interfacing that communicates with said memory means and said processing means and display means for displaying that communicates with said interface means.

A distributed power source for a mobile computing device comprises first distributed load means having first and second load terminals for providing at least a first distributed load, wherein the first distributed load means is selected from a group consisting of a central processing unit (CPU), a memory, a graphics processing unit (GPU), a hard disk drive (HDD), and a DVD drive. Second distributed load means having first and second load terminals for providing at least a second distributed load, wherein the second distributed load means is selected from a group consisting of a central processing unit (CPU), a memory, a graphics processing unit (GPU), a hard disk drive (HDD), and a DVD drive. First distributed source means for providing power that includes a first battery that is directly connected and supplies power to the first and second load terminals of the first distributed load means. Second distributed source means for providing power that includes a second battery that is directly connected and supplies power to the first and second load terminals of the second distributed load means. The first load terminals of the first and second distributed load communicate and the second load terminals of the first and second distributed load center communicate. The first distributed source means supplies power to the second distributed load means. The second distributed source means supplies power to the first distributed load means.

In other features, a mobile computing device comprises the distributed power system. A laptop comprises the distributed power system. A battery pack includes the first and second batteries. A first battery pack includes the first battery and a second battery pack includes the second battery. The first and the second batteries include Lithium Ion batteries. A battery pack includes the first battery, the second battery, and a first connection between first terminals of the first and second batteries and a second connection between second terminals of the second batteries. Motherboard means provides connections between first terminals of the first and second batteries and between second terminals of the first and second batteries. The connections include first metal connecting means that connect the first terminals of the first and second batteries to power traces/planes of the motherboard means. Second metal connecting means connects the second terminals of the first and second batteries to ground traces/planes of the motherboard means.

In other features, the first battery has a first capacity and the second battery has a second capacity. The first battery pack has first physical dimensions and the second battery pack has second physical dimensions. At least one of the first physical dimensions is different than at least one of the second physical dimensions. The first battery pack is located remotely from the second battery pack in the mobile computing device. First DC/DC converting means converts a first voltage from the first battery to a second voltage for the first distributed load center. The DC/DC converting means is one of a step-down converter and a step-up converter. Second DC/DC converting means converts a third voltage from the second battery to a fourth voltage for the second distributed load center.

In other features, first DC/DC converting means converts a first voltage from the first battery to a second voltage. Second DC/DC converting means converts the second voltage from the first DC/DC converting means to a third voltage for the first distributed load center. The first DC/DC converting means is a step-down converter and the second DC/DC converting means is a step-up converter. The second DC/DC converting means is a 1:n converter. At least one of the first battery and the second battery includes a universal serial bus (USB) battery. The USB battery includes short circuit protecting means for preventing short circuits. The first distributed load center operates at a first voltage and the second distributed load center operates at at least one of the first voltage and a second voltage. The DC/DC converting means has a conversion ratio that is less than or equal to 4:1.

In other features, first switch means selectively disconnects at least one of the first and second terminals of the first battery. Second switch means selectively disconnects at least one of the first and second terminals of the second battery. Short circuit detecting module communicates with at least one of the first and second switch means, detects a short circuit in at lease, one of the first and second batteries and selectively disconnects at least one of the first and second batteries. The first DC/DC converting means operates at a first frequency and the second DC/DC converting means operates at a second frequency that is different than the first frequency.

In other features, the mobile computing device comprises processing means for processing, memory means for storing that communicates with said processing means, interface means for interfacing that communicates with said memory means and said processing means and display means for displaying that communicates with said interface means.

A distributed power system for a mobile computing device comprises a motherboard that is adapted to be independently connected to a first distributed power system including a first battery and a second distributed power system including a second battery. A first distributed load center has first and second load terminals, includes at least a first distributed load and primarily receives power from the first distributed power system during use. A second distributed load center has first and second load terminals, includes at least a second distributed load and primarily receives power from the second distributed power system during use. The motherboard provides connections between the first load terminals of the first and second distributed load centers and the second load terminals of the first and second distributed load centers.

In other features, the first distributed load is selected from a group consisting of a central processing unit (CPU), a memory, a graphics processing unit (GPU), a hard disk drive (HDD), and a DVD drive. The first distributed load is selected from a group consisting of a central processing unit (CPU), a memory, a graphics processing unit (GPU), a hard disk drive (HDD), and a DVD drive. A laptop comprises the distributed power system. A battery pack includes the first and second batteries. A first battery pack includes the first battery and a second battery pack includes the second battery. The first and the second batteries include Lithium Ion batteries. A battery pack includes the first battery, the second battery, and a first connection between first terminals of the first and second batteries and a second connection between second terminals of the first and second batteries.

In other features, a mobile computing device comprises the distributed power system. The connections include first metal stiffeners that connect the first terminals of the first and second distributed load centers to power traces/planes of the motherboard. Second metal stiffeners connect the second terminals of the first and second distributed load centers to ground traces/planes of the motherboard. The first battery has a first capacity and the second battery has a second capacity that is different than the first capacity.

In other features, the first battery pack has first physical dimensions and the second battery pack has second physical dimensions. At least one of the first physical dimensions is different than at least one of the second physical dimensions. The first battery pack is located remotely from the second battery pack in the mobile computing device. A first DC/DC converter receives a first voltage from the first battery and outputs a second voltage to the first distributed load center. The DC/DC converter is one of a step-down converter and a step-up converter. A second DC/DC converter receives a third voltage from the first battery and outputs a fourth voltage to the second distributed load center. A first DC/DC converter receives a first voltage from the first battery and outputs a second voltage. A second DC/DC converter that receives the second voltage from the first DC/DC converter and that outputs a third voltage to the first distributed load center. The first DC/DC converter is a step-down converter and the second DC/DC converter is a step-up converter. The second DC/DC converter is a 1:n converter. At least one of the first battery and the second battery includes a universal serial bus (USB) battery. The USB battery includes a short circuit protection device.

In other features, the first distributed load center operates at a first voltage and the second distributed load center operates at at least one of the first voltage and a second voltage. The DC/DC converter has a conversion ratio that is less than or equal to 4:1. A first contactor selectively disconnects at least one of first and second terminals of the first distributed power system. A second contactor selectively disconnects at least one of first and second terminals of the second distributed power system. A short circuit detecting module communicates with at least one of the first and second contactors, detects a short circuit in at least one of the first and second distributed power systems and selectively disconnects at least one of the first and second distributed power systems. The first DC/DC converter operates at a first frequency and the second DC/DC converter operates at a second frequency that is different than the first frequency.

A method of providing a distributed power source for a mobile computing device comprises providing a motherboard that is adapted to be independently connected to a first distributed power system including a first battery and a second distributed power system including a second battery; providing a first distributed load center that has first and second load terminals and that includes at least a first distributed load; primarily receiving power at the first distributed load center from the first distributed power system during use; providing a second distributed load center that has first and second load terminals and that includes at least a second distributed load; primarily receiving power at the second load center from the second distributed power system during use; and connecting the first load terminals of the first and second distributed load centers and the second load terminals of the first and second distributed load centers using the motherboard.

In other features, the first distributed load is selected from a group consisting of a central processing unit (CPU), a memory, a graphics processing unit (GPU), a hard disk drive (HDD), and a DVD drive, and the second distributed power system, wherein the first distributed load is selected from a group consisting of a central processing unit (CPU), a memory, a graphics processing unit (GPU), a hard disk drive (HDD), and a DVD drive. The method includes implementing the distributed power system in a laptop computer. The method includes packaging the first and second batteries in a battery pack. The method includes packaging the first battery in a first battery pack and the second battery in a second battery pack. The first and second batteries comprise Lithium Ion batteries.

In other features, the method includes providing a battery pack that includes the first battery, the second battery, and a first connection between first terminals of the first and second batteries and a second connection between second terminals of the second batteries. The method includes implementing the distributed power system in the mobile computing device. The method includes using first metal stiffeners to connect the first terminals of the first and second batteries to power traces/planes of the motherboard and second metal stiffeners to connect the second terminals of the first and second batteries to a ground traces/planes of the motherboard.

In still other features, the first battery has a first capacity and the second battery has a second capacity that is not equal to the first capacity. The first battery pack has first physical dimensions and the second battery pack has second physical dimensions. At least one of the first physical dimensions is different than at least one of the second physical dimensions. The method includes locating the first battery pack remotely from the second battery pack in the mobile computing device. The method includes providing a first DC/DC converter that receives a first voltage from the first battery and that outputs a second voltage to the first load. The DC/DC converter is one of a step-down converter and a step-up converter. A second DC/DC converter that receives a third voltage from the first battery and that outputs a fourth voltage to the second load.

In yet other features, the method includes providing a first DC/DC converter that receives a first voltage from the first battery and that outputs a second voltage; and providing a second DC/DC converter that receives the second voltage from the first DC/DC converter and that outputs a third voltage to the first load. The first DC/DC converter is a step-down converter and the second DC/DC converter is a step-up converter. The second DC/DC converter is a 1:n converter. At least one of the first battery and the second battery includes a universal serial bus (USB) battery. The USB battery includes a short circuit protection device.

In still other features, the method includes operating the first distributed load center at a first voltage and the second distributed load center at at least one of the first voltage and a second voltage. The DC/DC converter has a conversion ratio that is less than or equal to 4:1. The method includes selectively disconnecting at least one of the first and second terminals of the first battery; selectively disconnecting at least one of the first and second terminals of the second battery; and detecting a short circuit in at least one of the first and second batteries and selectively disconnecting at least one of the first and second batteries. The first DC/DC converter operates at a first frequency and the second DC/DC converter operates at a second frequency that is different than the first frequency.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 15 is a functional block diagram of a mobile computing device including a distributed power source and current sense and protection modules according to the present invention;

FIG. 16A is an exemplary electrical schematic of a current protection module;

FIG. 16B is an exemplary electrical schematic of another current protection module;

FIG. 16C is an exemplary electrical schematic of an active current protection module.

DETAILED DESCRIPTION OF THE PREFERRED EMBODIMENTS

Figure 1A:
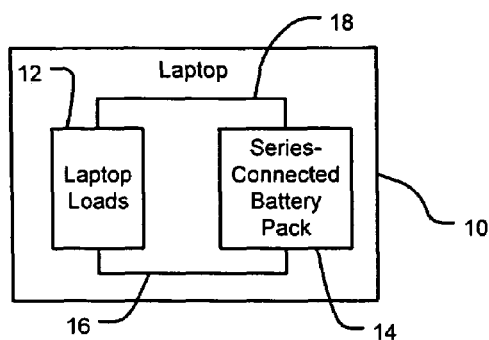
FIG. 1A is a functional block diagram of a laptop computer including a battery pack with batteries that are connected in series according to the prior art.

The following description of the preferred embodiments is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality. While the present invention will be described in conjunction with laptop computers and/or laptop loads, the present invention applies to any mobile digital computing device and/or mobile computing device load. As used herein, the term mobile computing device refers to digital devices that include at least one integrated circuit and that are capable of being powered by a mobile power source such as a battery or other portable power storage device. Examples of mobile computing devices include, but are not limited to, laptop computers, MP3 players, personal digital assistants (PDAs), and the like.

Figure 1B:
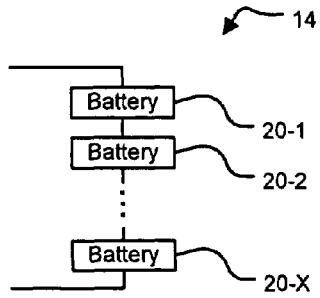
FIG. 1B is a functional block diagram of a plurality of batteries connected in series according to the prior art.
Figure 1C:
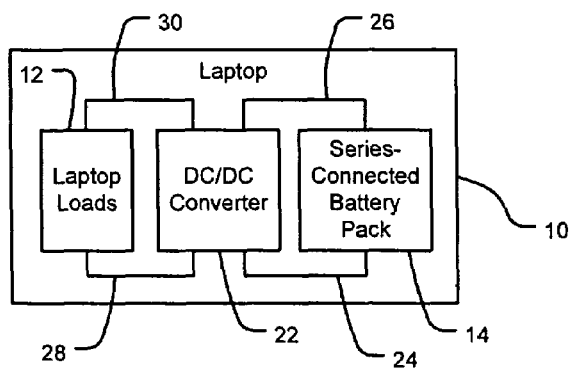
FIG. 1C is a functional block diagram of a laptop computer including a DC/DC converter and a battery pack according to the prior art.

Referring now to FIGS. 1A, 1B and 1C, a mobile computing device such as a laptop computer 10, according to the prior art, includes one or more loads 12 such as laptop loads and a battery pack 14 that powers the loads 12. The battery pack 14 includes batteries that are connected in series. The battery pack 14 functions as a centralized energy source for the laptop loads 12. In other words, the battery pack 14 provides current and voltage to the laptop loads 12 through conductors 16 and/or 18. One of the conductors 16 and/or 18 may be connected to a reference potential such as ground. In FIG. 1B, the battery pack 14 includes batteries 20-1, 20-2, . . . , and 20-X (collectively batteries 20) that are connected in series, where X is greater than 1. In conventional battery pack designs, the batteries 20 are connected in series to increase voltage and decrease current.

The laptop 10 may include a DC/DC converter 22 as shown in FIG. 1C. The DC/DC converter 22 communicates with the battery pack 14 via conductors 24 and/or 26. The laptop loads 12 communicate with the DC/DC converter 22 via conductors 28 and/or 30. One of the conductors may be connected to a reference potential such as ground. In this manner, the DC/DC converter 22 receives a first voltage level from the battery pack 14 and outputs a second voltage level to the laptop loads 12. For example, the battery pack 14 may output a battery pack voltage such as 12V. The DC/DC converter 22 converts the battery pack voltage to a lower voltage level such as a 1V supply voltage for use by the laptop loads 12. In other words, the DC/DC converter 22 in this example is a step-down converter with a 12:1 conversion ratio. As described above, high conversion ratios tend to have relatively high conversion loss. Increasing the battery pack voltage decreases energy loss associated with parasitic distribution resistance while concurrently increasing loss due to conversion inefficiency.

Figure 2A:
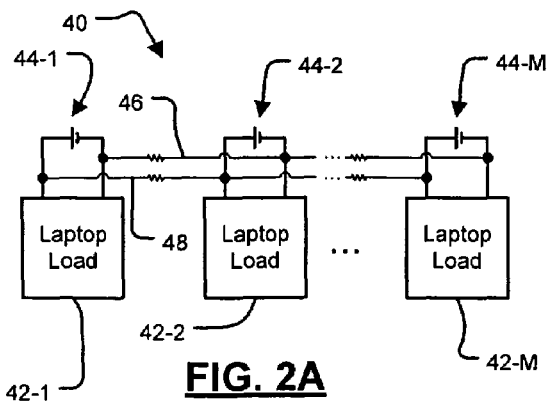
FIG. 2A is a schematic diagram of a parallel battery arrangement for a battery pack and laptop computer loads according to the present invention.

Referring now to FIG. 2A, a power distribution system 40 for a mobile computing device according to the present invention includes one or more load centers 42-1, 42-2, . . . , and 42-M, (referred to collectively as load centers or loads 42). Each of the distributed load centers 42 includes one or more loads. One or more distributed power sources such as batteries 44-1, 44-2, . . . , and 44-M, (referred to collectively as batteries 44) are connected in parallel to the loads 42. In other words, battery 44-1 is directly connected and provides power to the load 42-1. The battery 44-2 is directly connected and provides power to the load 42-2. The battery 44-M provides power to the load 42-M. The load centers 42 may include multiple loads. In other words, the number of batteries 44 and loads 42 need not be equal.

The parallel distributed arrangement of the batteries 44 allows power to be distributed to the loads in an optimal manner. For example, typical laptop computer subsystems include loads such as semiconductor loads and other types of loads that are physically dispersed throughout the laptop computer. In the present invention, each load 42 can receive power from an optimally-located battery 44. In contrast, the loads 12 (as shown in FIGS. 1A and 1C) receive power from a single, centrally-located battery pack 14.

In one implementation, the current requirements of the loads 42 may be imbalanced. For example, the load 42-1 may require more current than the load 42-2. To prevent uneven power consumption, the power distribution system 40 includes one or more terminal connections 46 and 48. The terminal connections 46 and 48 may be any suitable conductive material that shorts the first terminals and the second terminals of the load centers 42 and/or batteries 44, respectively. In other words, the first terminal of the first battery is connected to the first terminals of other batteries in the battery pack. A similar approach is used for the second terminals. For example, the terminal connections 46 and 48 may include, but are not limited to, conductive wire and/or metal stiffeners connected to printed circuit board (PCB) power traces/planes (PT/P) and/or ground traces/planes (GT/P).

Figure 2B:
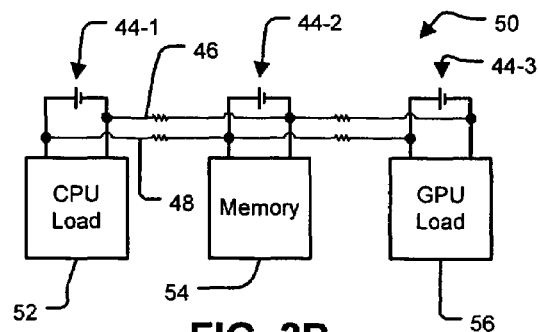
FIG. 2B is a schematic diagram of a parallel battery arrangement for central processing unit (CPU), memory and graphics processing unit (GPU) loads according to one implementation of the present invention.

Referring now to FIG. 2B, an exemplary power distribution system 50 includes a central processing unit (CPU) load 52, a memory load 54, and a graphics processing unit (GPU) load 56. The CPU load 52, the memory load 54, and the GPU load 56 may have different current requirements. The terminal connections 46 and 48 allow the different loads to receive power from one or more of the batteries 44.

Figure 3B:
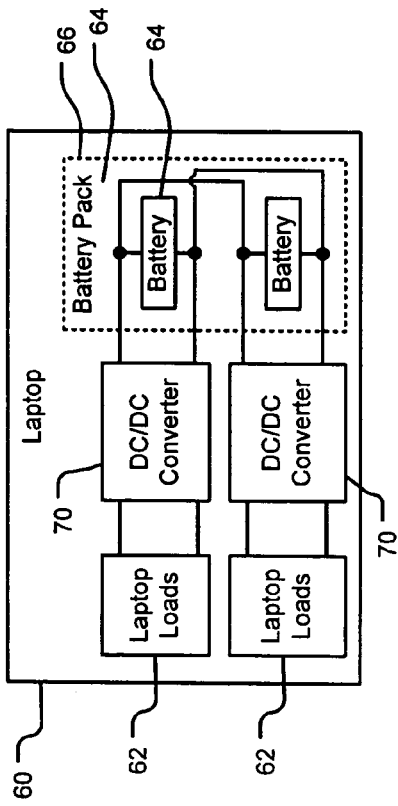
FIG. 3B is a functional block diagram of a parallel battery arrangement including battery terminals that are connected in parallel and DC/DC converters according to the present invention.
Figure 3A:
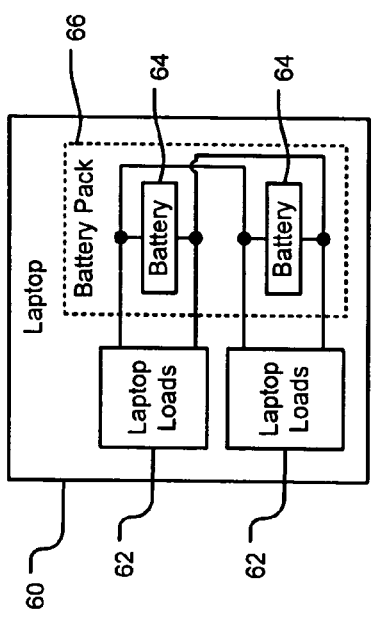
FIG. 3A is a functional block diagram of a parallel battery arrangement including battery terminals that are connected in parallel according to the present invention.

Referring now to FIG. 3A, a laptop computer 60 according to a first exemplary implementation of the present invention is shown. The laptop computer 60 includes loads 62 and batteries 64 that are connected in a parallel distribution arrangement. The batteries 64 are incorporated in a battery pack 66. The batteries 64 provide power to the loads 62 by way of multiple corresponding connections between the battery pack 66 and the loads 62. The batteries 64 are connected (as described in FIGS. 2A and 2B) within the battery pack 66.

Figure 3D:
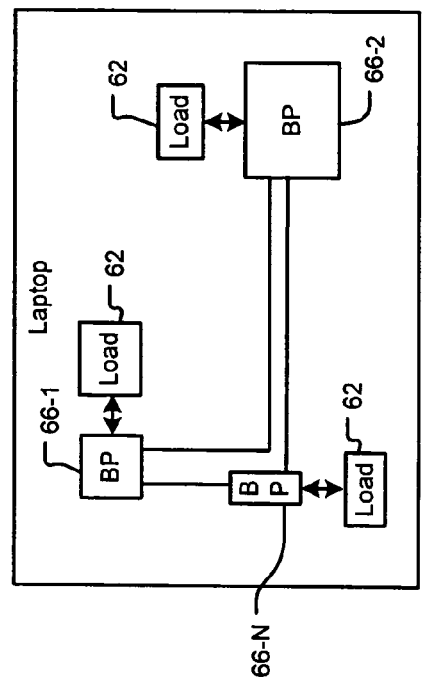
FIG. 3D illustrates the arrangement of battery packs having different dimensions in a mobile computing device.
Figure 3C:
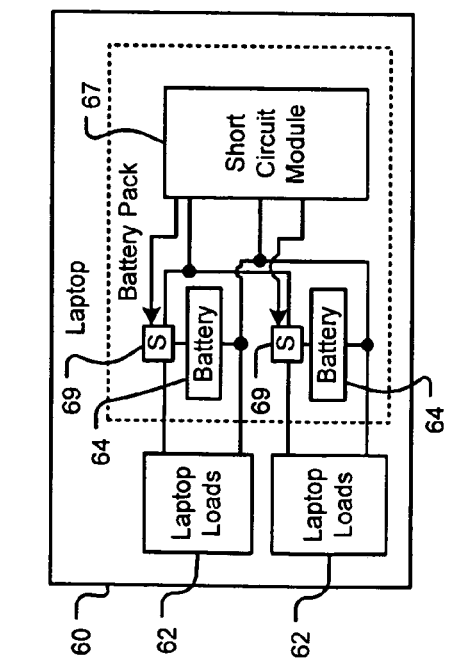
FIG. 3C illustrates the battery of FIG. 3A with a short circuit detecting module.

Referring now to FIG. 3C, the battery pack 66 may incorporate a short circuit detecting module 67 that isolates the batteries 64 when a short circuit condition is present. In other words, the short circuit detecting module 67 monitors the battery pack to determine when the terminals of a battery are shorted and/or when the first terminal of a battery is shorted to the second terminal of another battery. The short circuit detecting module 67 may selectively change a position of switches or contactors 69 to isolate a battery.

Referring back to FIG. 3A, although the battery pack 66 is shown located within the laptop computer 60, those skilled in the art can appreciate that the battery pack 66 may be located externally to the laptop computer 60. Further, the laptop computer 60 may include a plurality of battery packs 66 each including plural batteries connected in parallel as described above. For example, the laptop computer 60 may include battery packs 66 that are physically located on opposite sides of the laptop computer 60.

The parallel distribution arrangement of the loads 62 and the batteries 64 is advantageous to the manufacture of the battery pack 66. A battery pack that is connected in series with a load typically includes a plurality of batteries that are connected in a series. The battery pack is connected to the loads. One or more of the batteries may have a smaller capacity than the other batteries in the battery pack. In this arrangement, a smaller-capacity (i.e. weaker) battery may self-reverse charge when larger-capacity (i.e. stronger) batteries are discharging. As a result, the smaller-capacity battery is damaged, thereby decreasing the overall capacity of the battery pack. Each battery must be charged and discharged to determine actual storage capacities and to avoid including batteries with nonequivalent capacities within a battery pack.

The parallel distribution arrangement of the present invention eliminates manufacturing time and costs that are associated with balancing battery capacity. In a parallel battery pack arrangement, current is naturally distributed from the battery pack 66 to the loads 62. A stronger battery will provide more current than a weaker battery within the same battery pack, negating the possibility of reverse charging the weaker battery. As a result, the overall battery pack lifetime will increase and the maximum capacity of the battery pack 66 is used more effectively. For example, one or more of the batteries 64 may be discharged to a minimum voltage specification to fully exploit the energy of the battery pack and reverse charging will not occur. Similarly, the parallel distribution arrangement provides increased reliability. When one of the batteries 64 weakens over time, the stronger battery is able to supplement or replace the energy output of the weaker battery. Therefore, the overall capacity of the battery pack 66 is not significantly reduced.

Referring now to FIG. 3D, the laptop computer 60 may include batteries of different sizes in a parallel arrangement to further take advantage of this feature. For example, small form factor laptop computers may maximize available areas for fitting the batteries and/or battery packs 66 each with one or more batteries. In one implementation, the laptop computer 60 may include a first battery pack 66-1 having first set of dimensions and/or shape, a second battery pack 66-2 having second set of dimensions and/or shape and an $n^{th}$ battery pack 66-N, having an $n^{th}$ set of dimensions and/or shape. The battery packs are arranged adjacent to their primary loads 62. Each of the battery packs 66 includes one or more batteries. The battery packs 66 are connected together and/or to ground to allow load sharing as described above. In another implementation, the laptop computer 60 may include a battery and/or battery pack having an irregular size and/or shape. In still another implementation, the laptop computer 60 may include multiple mounting positions for batteries and/or battery packs to allow flexible battery pack placement. For example, a first battery pack may be mounted on a top side of the laptop computer 60 and a second battery pack may be mounted on a bottom side of the laptop computer 60. Alternatively, a plurality of battery packs may be mounted along an edge of the laptop computer 60 or at corners of the laptop computer 60.

The laptop computer 60 may also include one or more DC/DC converters 70 as shown in FIG. 3B. As described above with respect to FIG. 1C, the DC/DC converters 70 convert the higher voltages of the batteries 64 to lower voltages suitable for the loads 62. However, due to the parallel distribution arrangement of the laptop computer 60, the conversion ratio of the DC/DC converters 70 is reduced. For example, the DC/DC converters 70 may have less than a 4:1 conversion ratio. In other implementations, the conversion ratio is less than or equal to 3:1, 2:1 and/pr 1:1. Further, each of the DC/DC converters may have a different conversion ratio. As such, the overall efficiency of the laptop computer 60 is improved.

Certain semiconductor loads of the laptop computer 60 may require higher operating frequencies. For example, at an operating frequency of approximately 1 MHz, external passive components may be smaller and less expensive than comparable components operating with low frequency DC/DC converters. In the parallel distribution arrangement, the DC/DC converters 70 may operate at different frequencies. As a result, one of the DC/DC converters 70 may operate at a higher frequency (i.e. between 1 MHz and 4 MHz).

Figure 4A:
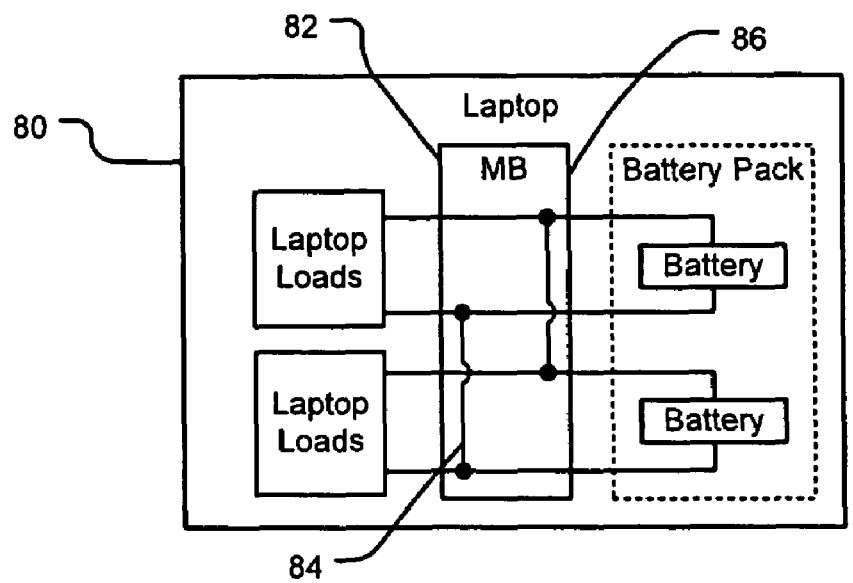
FIG. 4A is a functional block diagram of a parallel battery arrangement incorporating terminal connecting conductors on a motherboard according to the present invention.
Figure 4B:
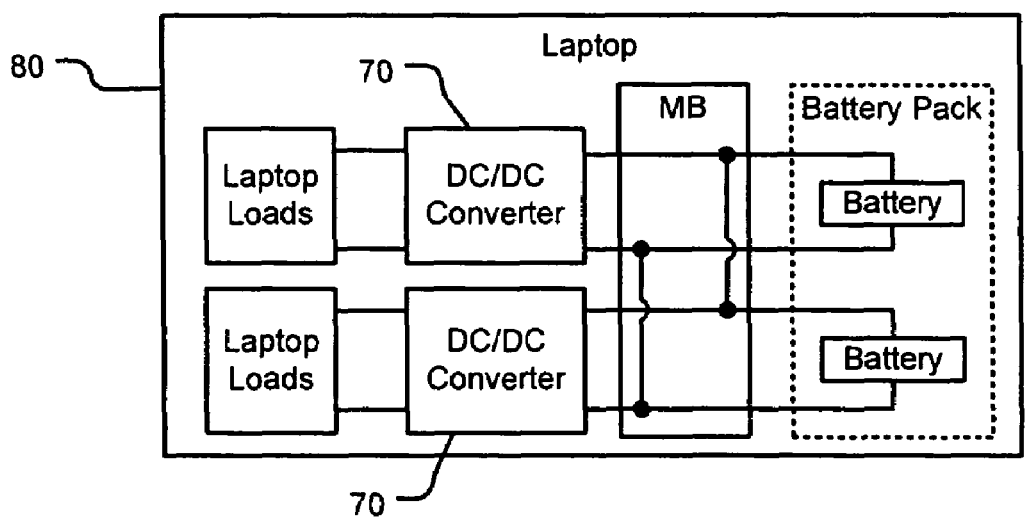
FIG. 4B is a functional block diagram of a parallel battery arrangement incorporating terminal connecting conductors on a motherboard and DC/DC converters according to the present invention.
Figure 5A:
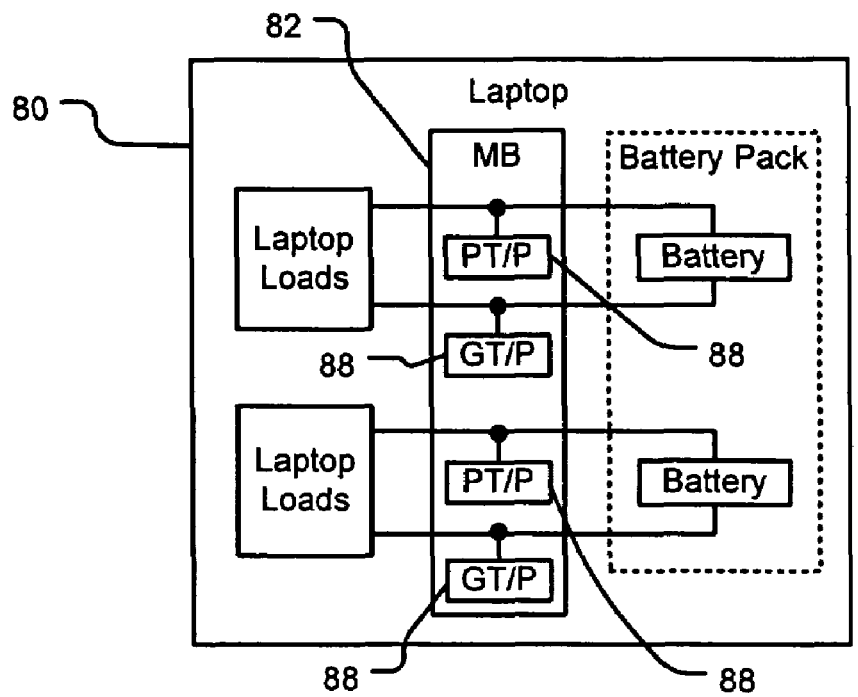
FIG. 5A is a functional block diagram of a parallel battery arrangement incorporating shorting metal stiffeners to ground and power planes on a motherboard according to the present invention.
Figure 5B:
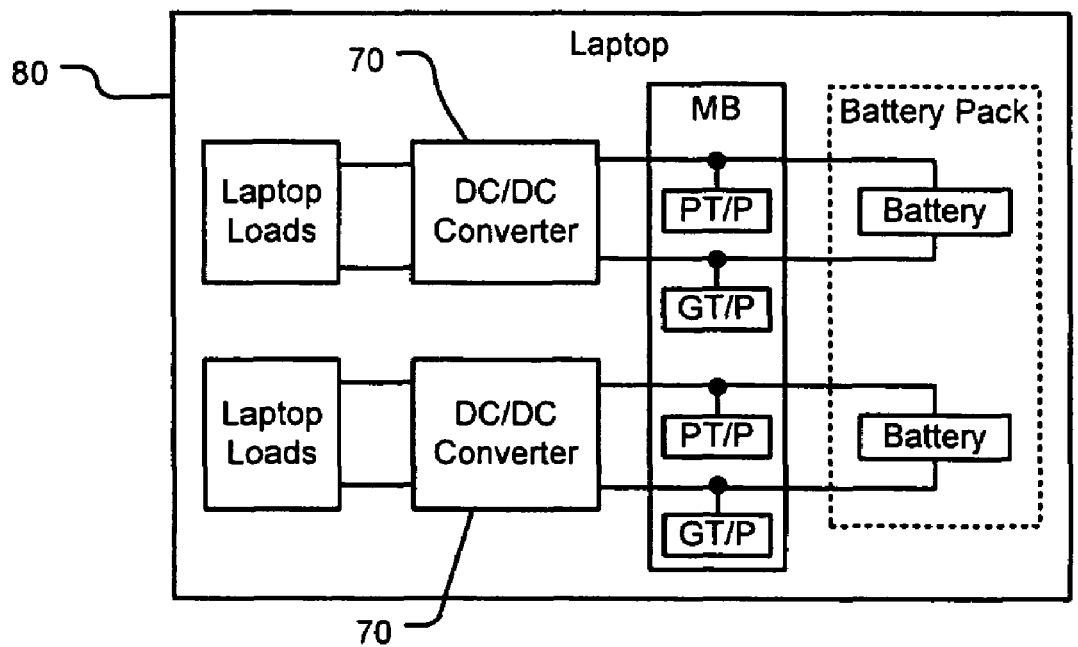
FIG. 5B is a functional block diagram of a parallel battery arrangement incorporating shorting metal stiffeners to ground and power planes on a motherboard and DC/DC converters according to the present invention.

Referring now to FIGS. 4A and 5A, a laptop computer 80 includes a motherboard 82. In this implementation, parallel connections between the batteries (as described above) are incorporated on the motherboard 82. For example, the terminal shorting connections may include connecting conductors 84 and 86 as shown in FIG. 4A. Alternatively, the terminal shorting connections may include metal stiffeners 88 that are connected to the PT/P and/or the GT/P of the motherboard 82. Referring now to FIGS. 4B and 5B, the laptop computer 80 may include one or more DC/DC converters 70 as described in previous implementations.

Figure 6:
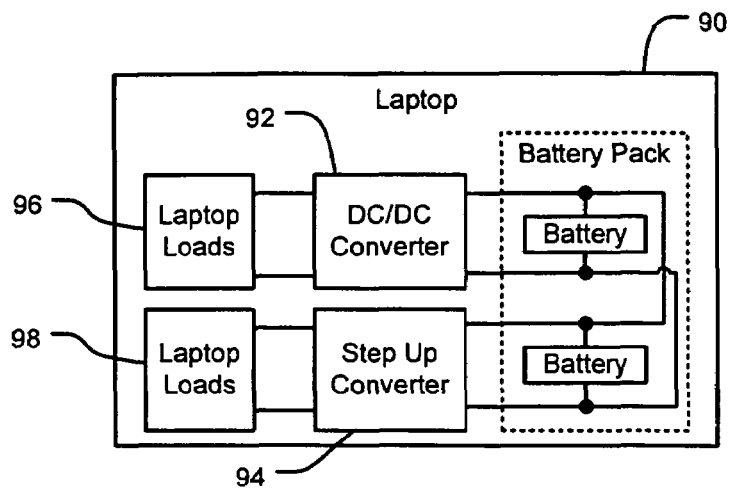
FIG. 6 is a functional block diagram of a parallel battery arrangement that includes a DC/DC converter and a step-up converter according to the present invention.
Figure 7:
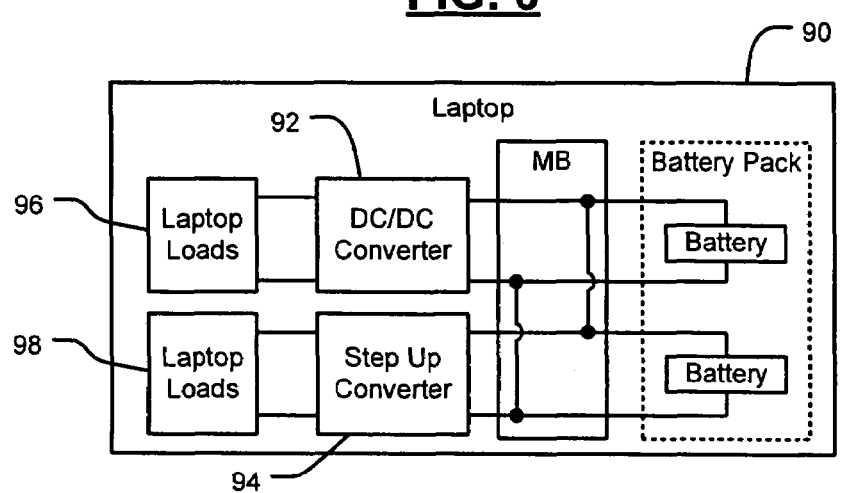
FIG. 7 is a functional block diagram of a parallel battery arrangement that includes a DC/DC converter and step-up converter according to the present invention.
Figure 8:
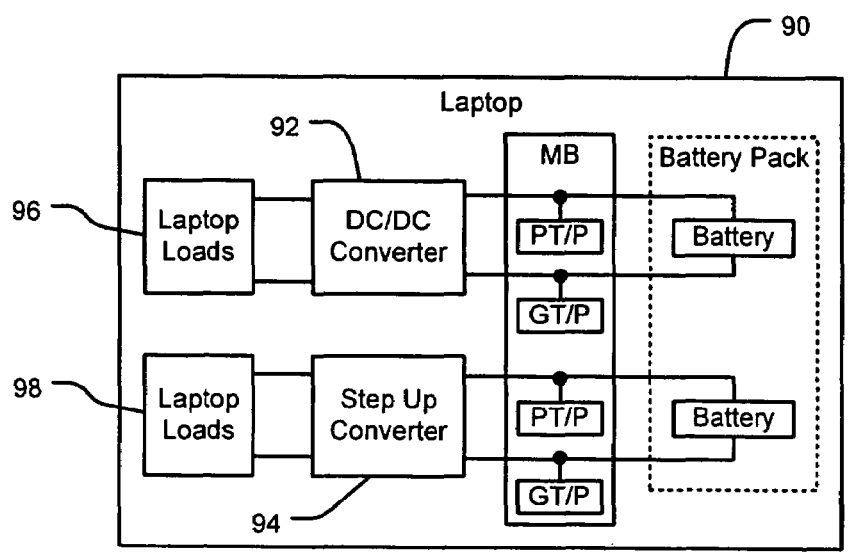
FIG. 8 is a functional block diagram of a parallel battery arrangement that includes a DC/DC converter and a step-up converter according to the present invention.

Referring now to FIGS. 6, 7 and 8, a laptop computer 90 may also include a step-down DC/DC converter 92 and a step-up DC/DC converter 94. Semiconductor devices in laptop computers may have relatively low voltage requirements. However, certain semiconductor devices may require higher voltages. For example, the laptop computer 90 may include a first load 96 and a second load 98. The first load 96 may require a first voltage, such as 1V. The second load 98 may require a second voltage that is greater than the first voltage, such as 5V. If the batteries provide a battery voltage output that is less than 5V and greater than 1V, step up and step down converters may be used. In the present implementation, the step-up DC/DC converter 94 boosts the voltage of the battery pack 66 to a voltage suitable for the load 98.

Figure 9:
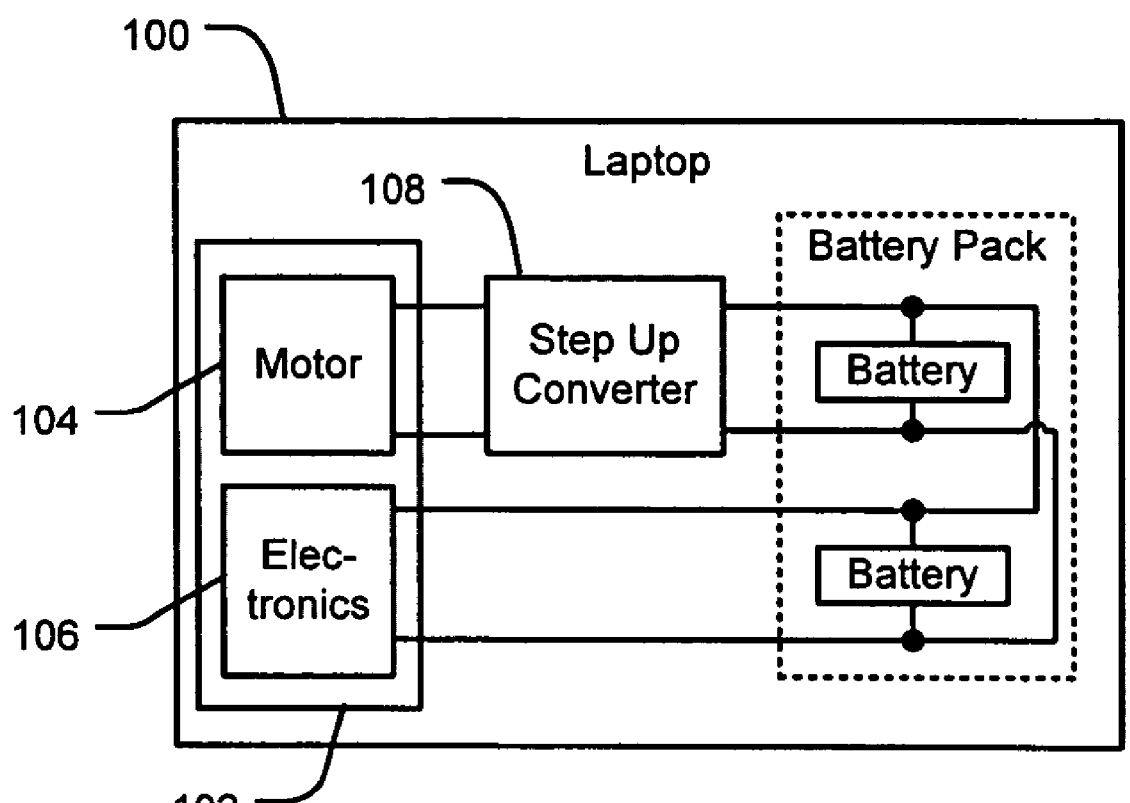
FIG. 9 is a functional block diagram of a parallel battery arrangement that includes peripheral devices and a step up converter.

In another implementation, the laptop computer 100 may include one or more peripheral devices 102 (i.e. a hard disk drive (HDD) or a digital video disc (DVD) system) that have more than one voltage requirement as shown in FIG. 9. For example, the peripheral device 102 may require a first voltage of 5V for a mechanical element such as a motor 104. The peripheral device 102 may require a second, lower voltage for another electronic element 106. In the present invention, the electronic element 106 may be able to operate at a range of supply voltages. For example, the electronic element 106 may operate on power from a single LiOn battery source or a supply voltage of 5V. In conventional systems that operate at 5V in a series arrangement, the electronic element 106, as well as the mechanical element 104, operate at 5V.

However, the peripheral device 102 may also operate in a parallel distribution arrangement in the laptop computer 100. In this manner, the laptop computer 100 includes a step-up DC/DC converter 108 that provides 5V to the mechanical element 104. A second step-up DC/DC converter is not required for the electronic element 106. In other words, the electronic element 106 is configured to operate at a lower supply voltage as well as operate at 5V, which negates the need for an additional step-up DC/DC converter.

Figure 10:
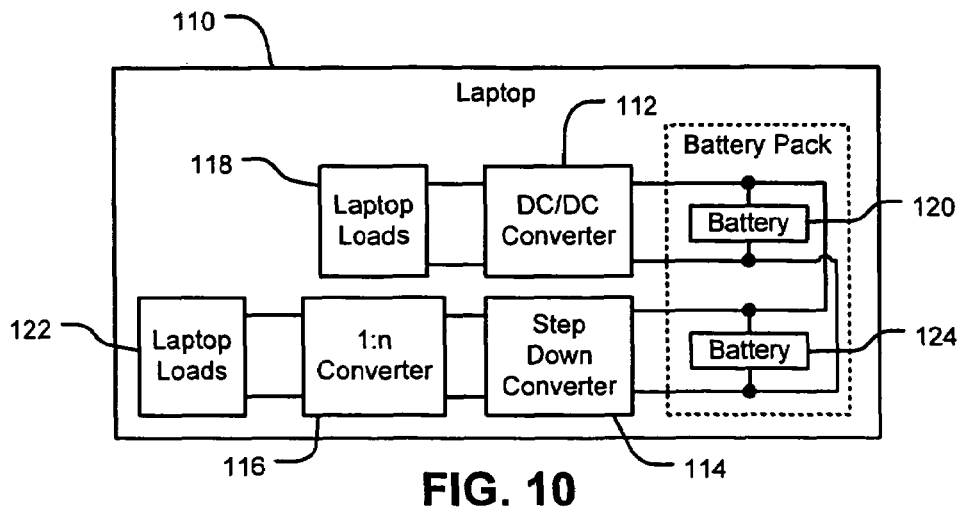
FIG. 10 is a functional block diagram of a parallel battery arrangement that includes single and two-stage converters according to the present invention.
Figure 11:
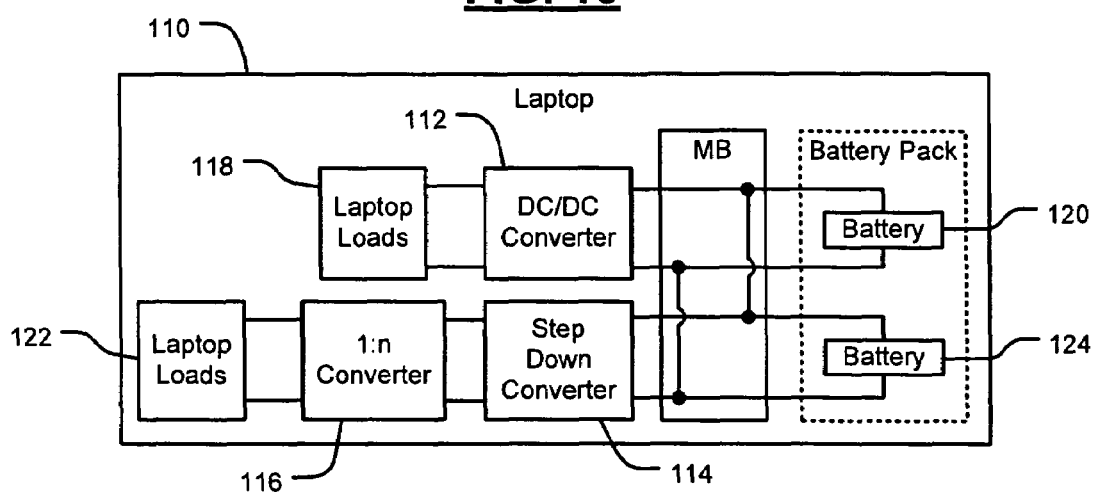
FIG. 11 is a functional block diagram of a parallel battery arrangement that includes single and two-stage converters according to the present invention.
Figure 12:
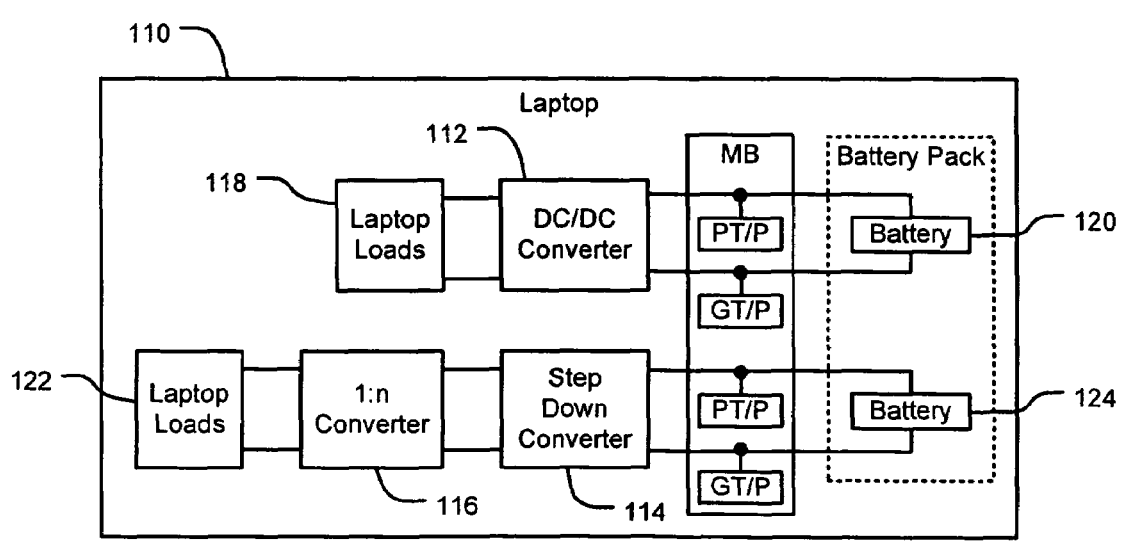
FIG. 12 is a functional block diagram of a parallel battery arrangement that includes single and two-stage converters according to the present invention.

Referring now to FIGS. 10-12, a laptop computer 110 converts a battery voltage to a 5V supply voltage according to a two-stage DC/DC conversion process. In some implementations, the battery is a Lithium-Ion battery, although other types of batteries may be used. The laptop computer 1 10 includes a DC/DC converter 112, a step-down DC/DC converter 114, and a 1:n step-up DC/DC converter 116. The DC/DC converter 112 may be a step-down or step-up converter according to the voltage requirements of the load 118. The DC/DC converter 112 converts the voltage of a battery 120 as described in previous implementations.

The use of a step-up boost converter may be less desirable for certain high current applications. For example, the voltage of the battery 124 may be between 2.7V and 4.2V. The step-down DC/DC converter 114 first converts the voltage of a battery 124 to a lower voltage. For example, the step-down DC/DC converter 114 converts the voltage of the battery 124 to 2.5V. The step-up DC/DC converter 116 subsequently converts the lower voltage to a higher voltage suitable for the load 122. For example, the step-up DC/DC converter 116 has a 1:2 conversion ratio and converts the output of the step-down DC/DC converter 114 to 5V. For higher voltage requirements, the step-up DC/DC converter 116 may have a 1:n conversion ratio as necessary.

Those skilled in the art can now appreciate from the foregoing description that the broad teachings of the present invention can be implemented in a variety of forms. The present invention may incorporate other known battery pack and/or power supply configurations in a parallel battery distribution. For example, a power supply or battery pack may implement a parallel battery distribution with universal serial bus (USB) technology according to any of the implementations described herein.

Figure 13:
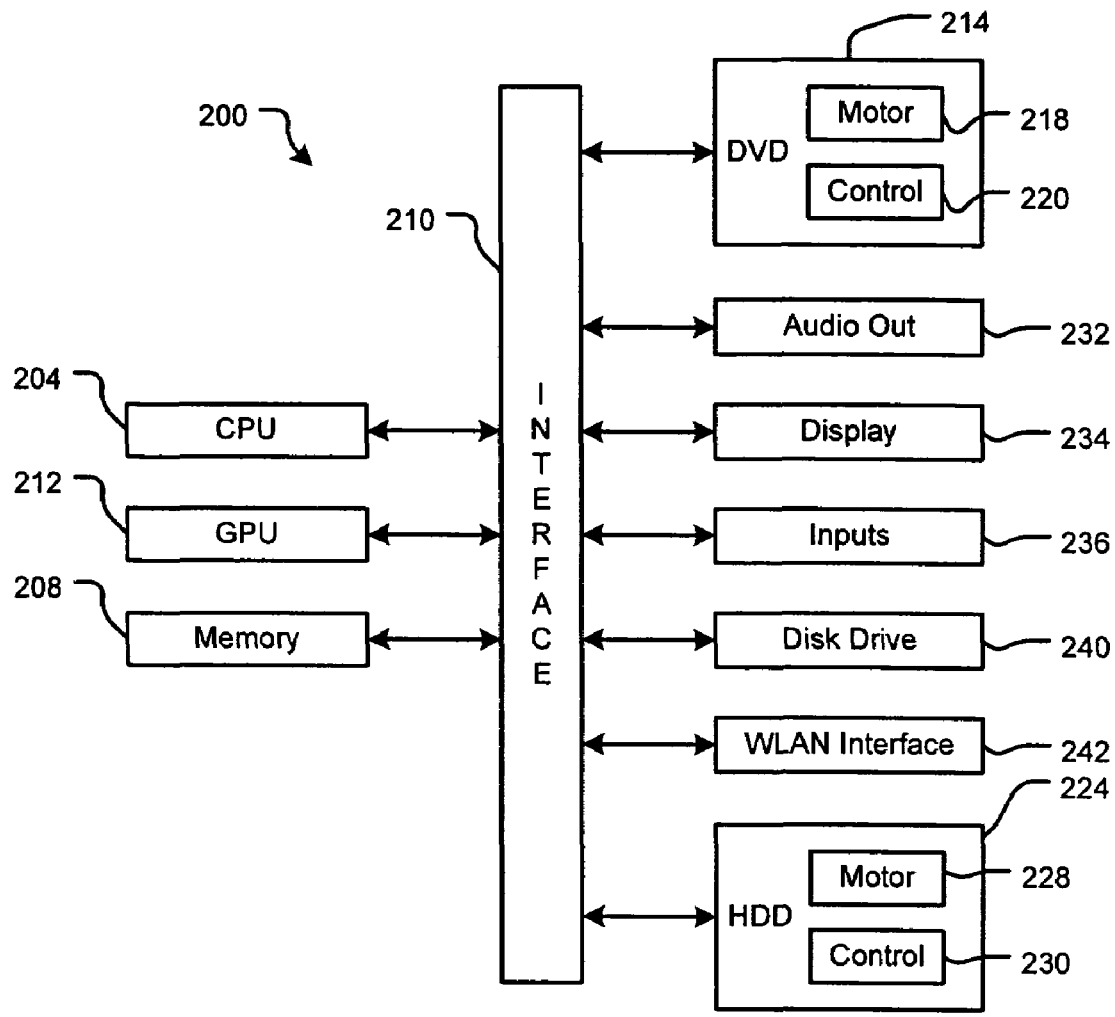
FIG. 13 is a functional block diagram of an exemplary mobile computing device with loads.

Referring now to FIG. 13, an exemplary mobile computing device 200 with loads is shown. The mobile computing device 200 includes a central processing unit (CPU) 204, memory 206 (such as random access memory, read only memory, and/or other suitable electronic storage) and an input/output (I/O) interface 210. The device 200 may further include a graphics processing unit (GPU) 212. The mobile computing device 200 may include one or more peripheral devices such as a digital versatile disc (DVD) 214 which includes one or more motors 218 and control 220. Additional peripheral devices may include a hard disk drive (HDD) 224, which may include one or more motors 228 and a control module to 230. The device 200 may include an audio output 232 such as an audio output jack or speaker. The device may include a display 234, inputs 236, a disk drive 240 and/or a wireless local area network interface 242. The inputs 236 may include audio input, a microphone, a kepypad, buttons, touch pad and/or other inputs. Components of the device 200 may be grouped into one or more distributed load centers and supplied in the manner described above.

Figure 14:
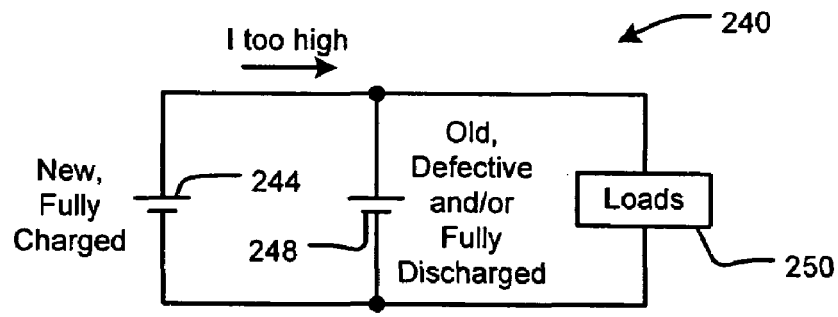
FIG. 14 illustrates current surge in mismatched batteries according to the prior art.

Referring now to FIG. 14, current surge in mismatched batteries according to the prior art is shown. A circuit 240 includes a first battery 244 and a second battery 248. The batteries 244 and 248 are connected in parallel and supply one or more loads 250. As can be appreciated, if the first battery 244 is a new and/or fully charged battery and the second battery 248 is in old, defective and/or fully discharged battery, current flowing to the second battery 248 may be too high and cause damage and/or other hazards.

Referring now to FIG. 15, a mobile computing device 300 includes a distributed power source 302 and current sense and protection modules according to the present invention. The device 300 includes batteries 304-1, 304-2, 304-3, and 304-4 (collectively batteries 304) that primarily supply loads 306-1, 306-2, 306-3, and 3064 (collectively loads 306), respectively. Sensing and protection modules 310-1, 310-2, 310-3 and 310-4 (collectively sensing and protection modules 310) are connected to the batteries 304-1, 304-2, 304-3, and 3044, respectively. The sensing and protection modules 310-1, 310-2, 310-3 and 310-4 sense current flowing through the batteries 304-1, 304-2, 304-3, and 304-4 in any suitable manner limit current as will be described below. A control module 320 communicates with the sensing and protection modules 310, receives a sensed current signal and generates one or more control signals to control current flowing through the batteries 304. While four battery/load/sensing and protection module pairs are shown, additional and/or fewer pairs may be used in a particular implementation.

Referring now to FIG. 16A, a current protection module 330 is shown. The current protection module 330 includes a plurality of transistors 330-1, 330-2, 330-3, . . . , and 330-N. When current flowing through a respective battery is sufficiently low, the transistors 330 are turned on. When current exceeds a threshold, the transistors 330 are modulated and/or turned off to adjust a resistance RDS provided by each transistor 330. Some of the transistors can be selectively turned on while others are off. While parallel arrangement is shown, a series arrangement can also be used.

Referring now to FIG. 16B, another current protection circuit 340 includes a resistance 342 and a parallel connected switch 344. The switch 344 is normally closed. When current through a respective battery increases above a threshold, the switch 344 is opened to increase series resistance by adding the resistance 342. As a result, current flowing through the batter decreases.

Referring now to FIG. 16C, another current protection circuit 350 shown to include a variable resistance 352 and a parallel connected switch 354. The switch 354 is normally closed. When current through the battery increases above a threshold, the switch is opened to increase series resistance by adding the variable resistance 352. The resistance that is provided may be adjusted by the control module 320. As a result, current flowing through the batter decreases.

In some implementations, the batteries may be single cell batteries. The resistances can be implemented using resistors, transistors or other suitable components. The switches may be implemented using transistors or other suitable components.

While this invention has been described in connection with particular examples thereof, the true scope of the invention should not be so limited since other modifications will become apparent to the skilled practitioner upon a study of the drawings, the specification and the following claims.

What is claimed is:

1. A mobile computing device, comprising:
    a central processing unit (CPU);
    memory that communicates with said CPU;
    an interface that communicates with said memory and said CPU;
    a display that communicates with said interface;
    a first distributed load center having first and second load terminals and including at least a first distributed load, wherein said first distributed load includes at least one load that is selected from a group consisting of said CPU, said memory, a graphics processing unit (GPU) that communicates with said interface, a hard disk drive (HDD) that communicates with said interface, and a DVD drive that communicates with said interface;
    a second distributed load center having first and second load terminals and including at least a second distributed load, wherein said second distributed load includes at least one load that is selected from a group consisting of said CPU, said memory, a graphics processing unit (GPU) that communicates with said interface, a hard disk drive (HDD) that communicates with said interface, and a DVD drive that communicates with said interface;
    a first distributed power system that includes a first battery that is directly connected and primarily supplies power to said first and second load terminals of said first distributed load center; and
    a second distributed power system that includes a second battery that is directly connected and primarily supplies power to said first and second load terminals of said second distributed load center,
    wherein said first load terminals of said first and second distributed load center communicate and said second load terminals of said first and second distributed load center communicate,
    wherein said first distributed power system supplies power to said second distributed load center and wherein said second distributed power system supplies power to said first distributed load center, and
    wherein said first distributed power system supplies power to said first distributed load and said second distributed load while said second distributed power system supplies power to said first distributed load and said second distributed load.

2. The mobile computing device of claim 1 further comprising a sensing and protection module that senses current flowing to said first distributed power system and that selectively decreases said current.

3. The mobile computing device of claim 2 wherein said sensing and protection module includes a plurality of transistors that selectively increase resistance between said first distributed power system and said first distributed load center.

4. The mobile computing device of claim 2 wherein said sensing and protection module includes a resistance and parallel switch that selectively increase resistance between said first distributed power system and said first distributed load center.

5. The mobile computing device of claim 4 wherein said resistance is a variable resistance.

6. The mobile computing device of claim 1 wherein said mobile computing device comprises a laptop computer.

7. The mobile computing device of claim 1 further comprising a battery pack that includes said first and second batteries.

8. The mobile computing device of claim 1 further comprising a first battery pack that includes said first battery and a second battery pack that includes said second battery.

9. The mobile computing device of claim 8 wherein said first battery pack has first physical dimensions and said second battery pack has second physical dimensions, and wherein at least one of said first physical dimensions is different than at least one of said second physical dimensions.

10. The mobile computing device of claim 8 wherein said first battery pack is located remotely from said second battery pack in said mobile computing device.

11. The mobile computing device of claim 1 wherein said first and said second batteries include Lithium Ion batteries.

12. The mobile computing device of claim 1 further comprising a battery pack that includes said first battery, said second battery, and a first connection between first terminals of said first and second batteries and a second connection between second terminals of said first and second batteries.

13. The mobile computing device of claim 1 further comprising a motherboard that provides connections between said first load terminals of said first and second distributed load centers and between said second load terminals of said first and second distributed load centers.

14. The mobile computing device of claim 13 wherein said connections include:
    first metal stiffeners that connect said first terminals of said first and second distributed load centers to a power traces/planes of said motherboard; and
    second metal stiffeners that connect said second terminals of said first and second distributed load centers to a ground traces/planes of said motherboard.

15. The mobile computing device of claim 1 wherein said first battery has a first capacity and said second battery has a second capacity that is different than said first capacity.

16. The mobile computing device of claim 1 further comprising a first DC/DC converter that receives a first voltage from said first battery and that outputs a second voltage to said first distributed load center.

17. The mobile computing device of claim 16 wherein said DC/DC converter is one of a step-down converter and a step-up converter.

18. The mobile computing device of claim 16 further comprising a second DC/DC converter that receives a third voltage from said first battery and that outputs a fourth voltage to said second distributed load center.

19. The mobile computing device of claim 16 wherein said DC/DC converter has a conversion ratio that is less than or equal to 4:1.

20. The mobile computing device of claim 1 further comprising:
    a first DC/DC converter that receives a first voltage from said first battery and that outputs a second voltage;
    a second DC/DC converter that receives said second voltage from said first DC/DC converter and that outputs a third voltage to said first distributed load center.

21. The mobile computing device of claim 20 wherein said first DC/DC converter is a step-down converter and said second DC/DC converter is a step-up converter.

22. The mobile computing device of claim 21 wherein said second DC/DC converter is a 1:n converter.

23. The mobile computing device of claim 20 wherein said first DC/DC converter operates at a first frequency and said second DC/DC converter operates at a second frequency that is different than said first frequency.

24. The mobile computing device of claim 1 wherein at least one of said first battery and said second battery includes a universal serial bus (USB) battery.

25. The mobile computing device of claim 24 wherein said USB battery includes a short circuit protection device.

26. The mobile computing device of claim 1 wherein said first distributed load center operates at a first voltage and said second distributed load center operates at least one of said first voltage and a second voltage.

27. The mobile computing device of claim 1 further comprising:
a first contactor that selectively disconnects at least one of first and second terminals of said first distributed power system;
a second contactor that selectively disconnects at least one of first and second terminals of said second distributed power system; and
a short circuit detecting module that communicates with at least one of said first and second contactors, that detects a short circuit in at least one of said first and second distributed power systems and that selectively disconnects at least one of said first and second distributed power systems.

28. The mobile computing device of claim 27 wherein said short circuit detecting module disconnects said first distributed power system while maintaining contact between said second distributed power system and at least one of said first distributed load center and said second distributed load center.

29. The mobile computing device of claim 27 comprising a battery pack that includes said first battery and said second battery and said short circuit detecting module,
wherein said short circuit detecting module detects a short and isolates one of said first battery and said second battery.

30. The mobile computing device of claim 27 wherein said short circuit detecting module detects a first short when terminals of at least one of said first battery and said second battery are shorted and detects a second short when a first terminal of said first battery is shorted with a second terminal of said second battery, and
wherein said short circuit detecting module isolates at least one of said first battery and said second battery based on detection of at least one of said first short and said second short.

31. A method of providing a mobile computing device, comprising:
providing a central processing unit (CPU), memory that communicates with said CPU, an interface that communicates with said memory and said CPU, and a display that communicates with said interface;
providing a first distributed load center having first and second load terminals and including at least a first distributed load, wherein said first distributed load is selected from a group consisting of said central processing unit (CPU), said memory, a graphics processing unit (GPU), a hard disk drive (HDD), and a DVD drive;
providing a second distributed load center having first and second load terminals and including at least a second distributed load, wherein said second distributed load is selected from a group consisting of said central processing unit (CPU), said memory, a graphics processing unit (GPU), a hard disk drive (HDD), and a DVD drive;
distributing power to said first distributed load center using a first battery that is directly connected and supplies power to said first and second load terminals of said first distributed load center; and
distributing power to said second distributed load center using a second battery that is directly connected and supplies power to said first and second load terminals of said second distributed load center;
distributing power from said first battery to said first distributed load center and to said second distributed load center while distributing power from said second battery to said first distributed load center and to said second distributed load center,
wherein said first load terminals of said first and second distributed load center communicate and said second load terminals of said first and second distributed load center communicate.

32. The method of claim 31 further comprising:
sensing current flowing through said first and second batteries; and
limiting current flowing through said first and second batteries based on said sensed current.

33. The method of claim 31 further comprising implementing said distributed power system in a laptop computer.

34. The method of claim 31 further comprising packaging said first and second batteries in a battery pack.

35. The method of claim 31 further comprising packaging said first battery in a first battery pack and said second battery in a second battery pack.

36. The method of claim 35 wherein said first battery pack has first physical dimensions and said second battery pack has second physical dimensions, and wherein at least one of said first physical dimensions is different than at least one of said second physical dimensions.

37. The method of claim 35 further comprising locating said first battery pack remotely from said second battery pack in said mobile computing device.

38. The method of claim 31 wherein said first and second batteries comprise Lithium Ion batteries.

39. The method of claim 31 further comprising providing a battery pack that includes said first battery, said second battery, and a first connection between first terminals of said first and second batteries and a second connection between second terminals of said first and second batteries.

40. The method of claim 31 further comprising providing connections between first terminals of said first and second batteries and between second terminals of said first and second batteries using a motherboard.

41. The method of claim 40 further comprising using first metal stiffeners to connect said first terminals of said first and second batteries to power traces/planes of said motherboard and second metal stiffeners to connect said second terminals of said first and second batteries to a ground traces/planes of said motherboard.

42. The method of claim 31 wherein said first battery has a first capacity and said second battery has a second capacity that is not equal to said first capacity.

43. The method of claim 31 further comprising providing a first DC/DC converter that receives a first voltage from said first battery and that outputs a second voltage to said first distributed load.

44. The method of claim 43 wherein said DC/DC converter is one of a step-down converter and a step-up converter.

45. The method of claim 43 further comprising providing a second DC/DC converter that receives a third voltage from said first battery and that outputs a fourth voltage to said second distributed load.

46. The method of claim 45 wherein said first DC/DC converter is a step-down converter and said second DC/DC converter is a step-up converter.

47. The method of claim 46 wherein said second DC/DC converter is a 1:n converter.

48. The method of claim 43 wherein said DC/DC converter has a conversion ratio that is less than or equal to 4:1.

49. The method of claim 31 further comprising:
providing a first DC/DC converter that receives a first voltage from said first battery and that outputs a second voltage;
providing a second DC/DC converter that receives said second voltage from said first DC/DC converter and that outputs a third voltage to said first distributed load.

50. The method of claim 49 wherein said first DC/DC converter operates at a first frequency and said second DC/DC converter operates at a second frequency that is different than said first frequency.

51. The method of claim 31 wherein at least one of said first battery and said second battery includes a universal serial bus (USB) battery.

52. The method of claim 51 wherein said USB battery includes a short circuit protection device.

53. The method of claim 31 wherein said first distributed load center operates at a first voltage and said second distributed load center operates at least one of said first voltage and a second voltage.

54. The method of claim 31 further comprising:
selectively disconnecting at least one of said first and second terminals of said first battery;
selectively disconnecting at least one of said first and second terminals of said second battery; and
detecting a short circuit in at least one of said first and second batteries and selectively disconnecting at least one of said first and second batteries.

55. A mobile computing device, comprising:
a central processing unit (CPU);
memory that communicates with said CPU;
an interface that communicates with said memory and said CPU;
a display that communicates with said interface;
a battery pack that includes a first battery and a second battery;
a first distributed load center having first and second load terminals and including at least a first distributed load, wherein said first distributed load includes at least one load that is selected from a group consisting of said CPU, said memory, a graphics processing unit (GPU) that communicates with said interface, a hard disk drive (HDD) that communicates with said interface, and a DVD drive that communicates with said interface;
a second distributed load center having first and second load terminals and including at least a second distributed load, wherein said second distributed load includes at least one load that is selected from a group consisting of said CPU, said memory, a graphics processing unit (GPU) that communicates with said interface, a hard disk drive (HDD) that communicates with said interface, and a DVD drive that communicates with said interface;
a first distributed power system that includes said first battery that is directly connected and primarily supplies power to said first and second load terminals of said first distributed load center; and
a second distributed power system that includes said second battery that is directly connected and primarily supplies power to said first and second load terminals of said second distributed load center,
wherein said first load terminals of said first and second distributed load center communicate and said second load terminals of said first and second distributed load center communicate,
wherein said first distributed power system supplies power to said second distributed load center and wherein said second distributed power system supplies power to said first distributed load center,
wherein said first battery is in series with said second battery,
wherein said first distributed load center is connected in parallel with said first battery, and
wherein said second distributed load center is connected in parallel with said second battery.

56. The mobile computing device of claim 55 wherein said first battery is in parallel with said second battery.

57. The mobile computing device of claim 55 wherein said second distributed power system does not supply power to said second distributed load center when said first distributed power system supplies power to said second distributed load center, and
wherein said first distributed power system does not supply power to said first distributed load center when said second distributed power system supplies power to said first distributed load center.

58. The mobile computing device of claim 57 wherein said first distributed power system supplies power to said second distributed load center while said second distributed power system supplies power to said first distributed load center.

* * * * *